Jan. 14, 1964 E. G. SMITH 3,117,927
SLUDGE THICKENER
Filed Aug. 23, 1960 9 Sheets-Sheet 2
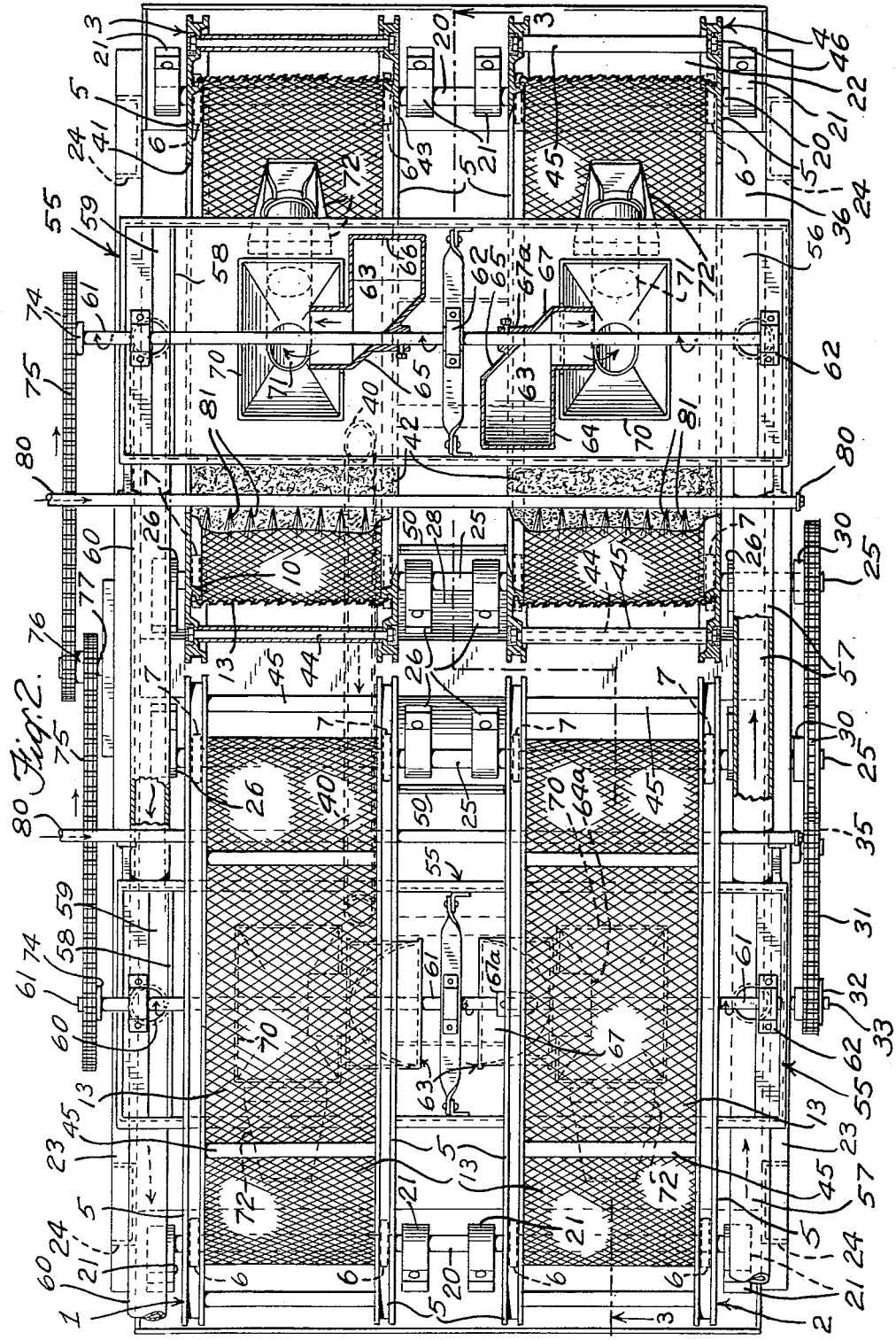

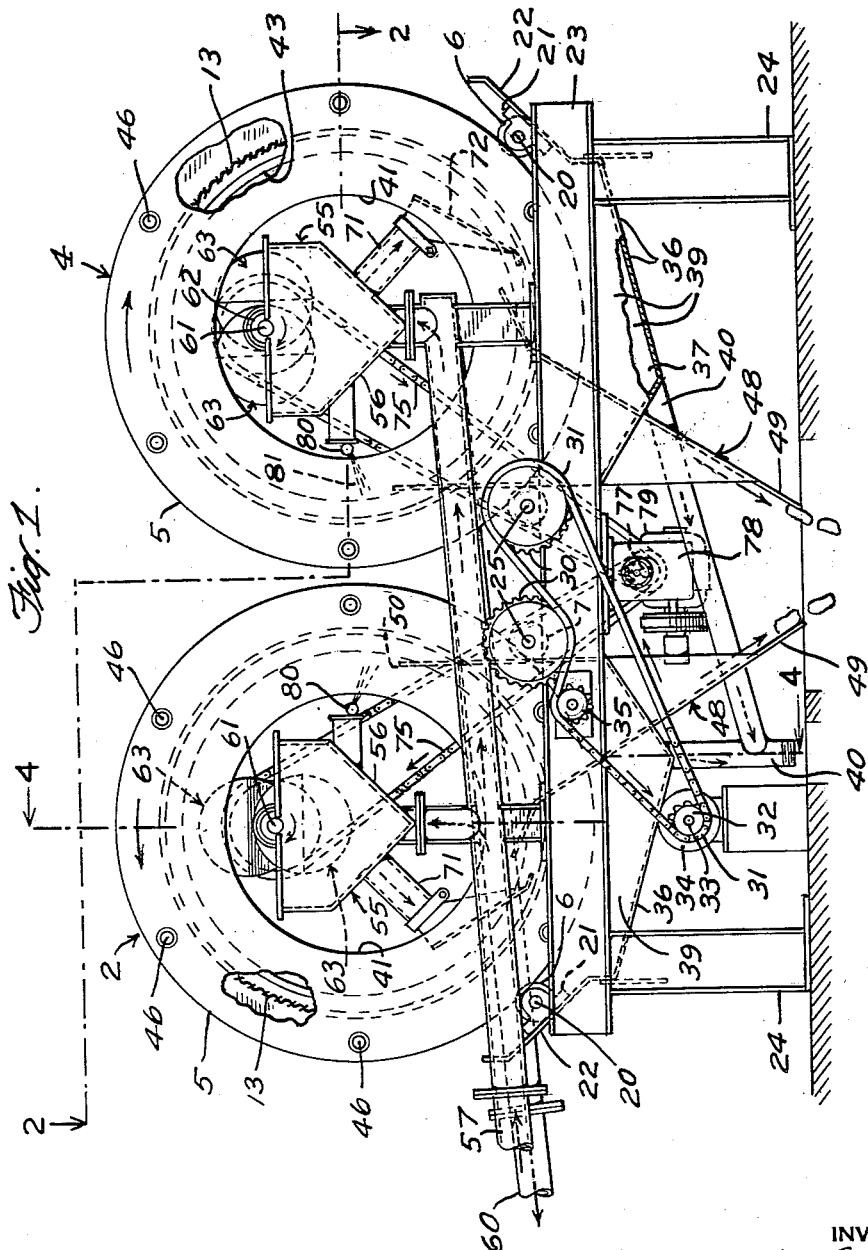

Jan. 14, 1964  E. G. SMITH  3,117,927
SLUDGE THICKENER
Filed Aug. 23, 1960  9 Sheets-Sheet 3
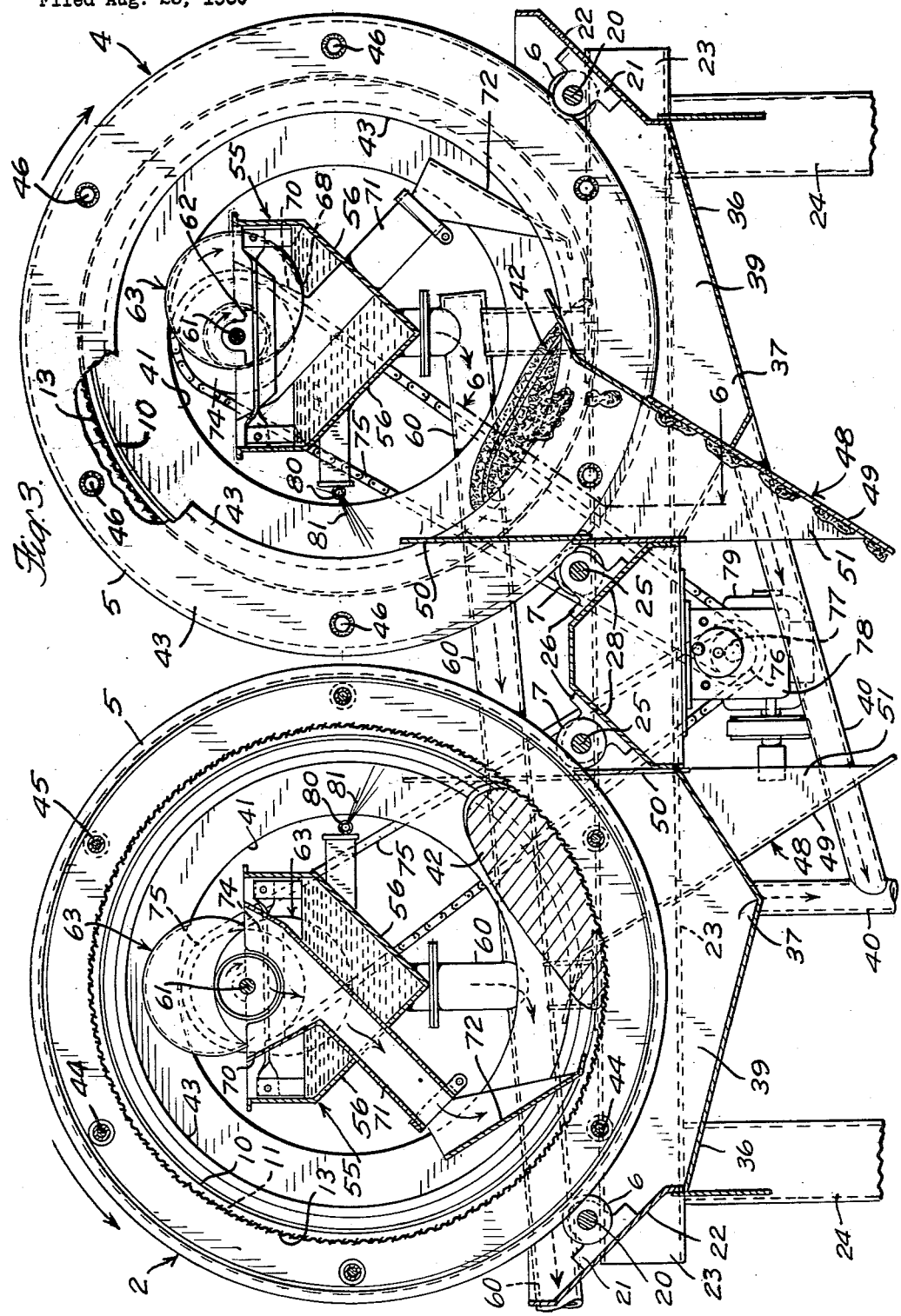

Jan. 14, 1964  E. G. SMITH  3,117,927
SLUDGE THICKENER
Filed Aug. 23, 1960  9 Sheets-Sheet 4
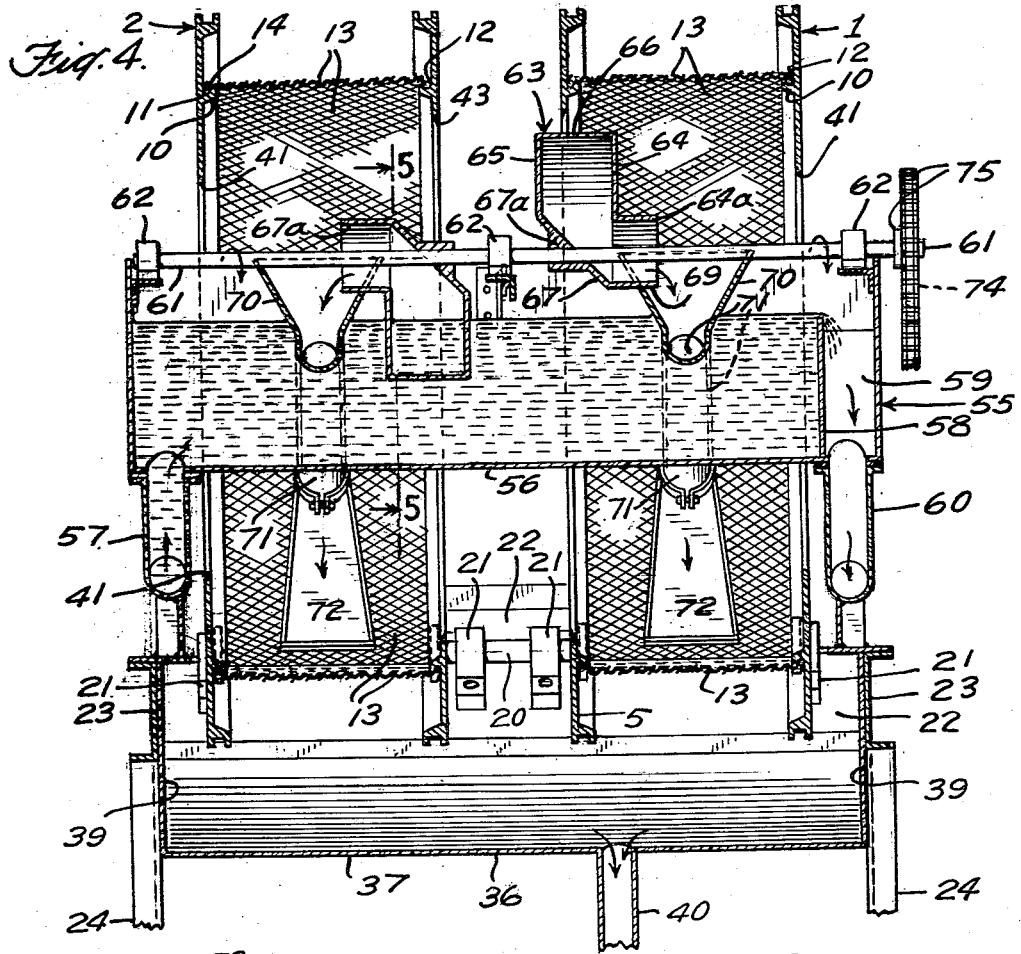
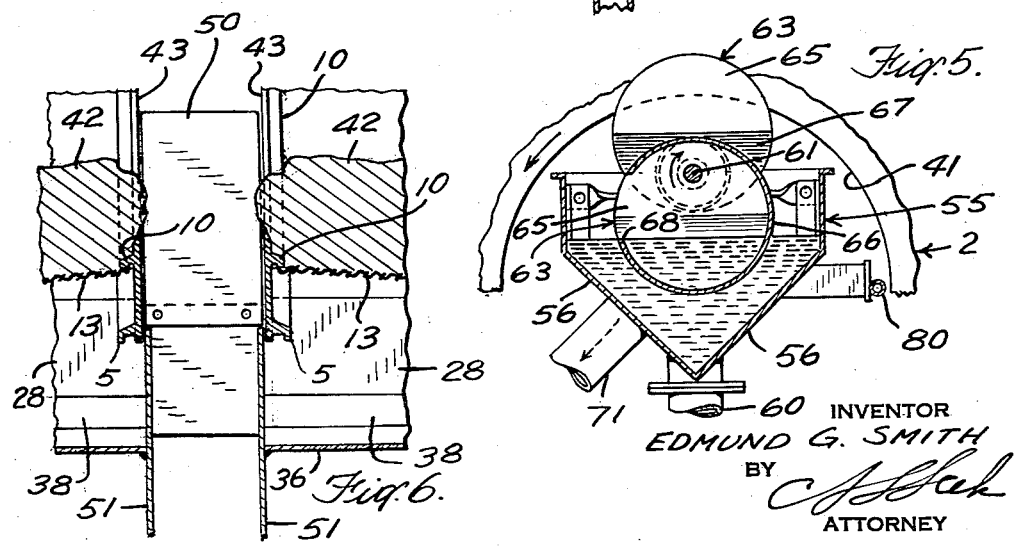
INVENTOR
EDMUND G. SMITH
BY
ATTORNEY

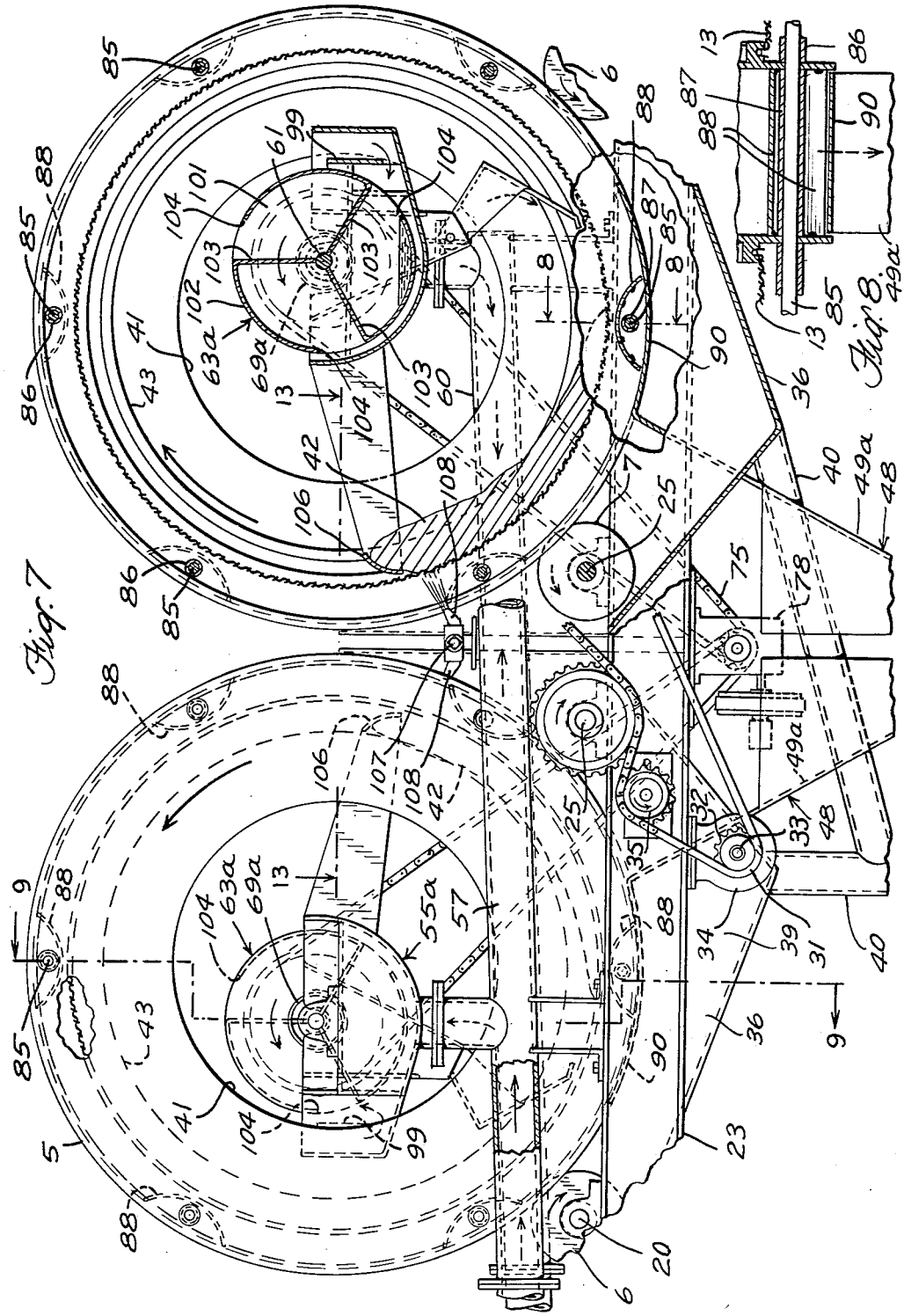

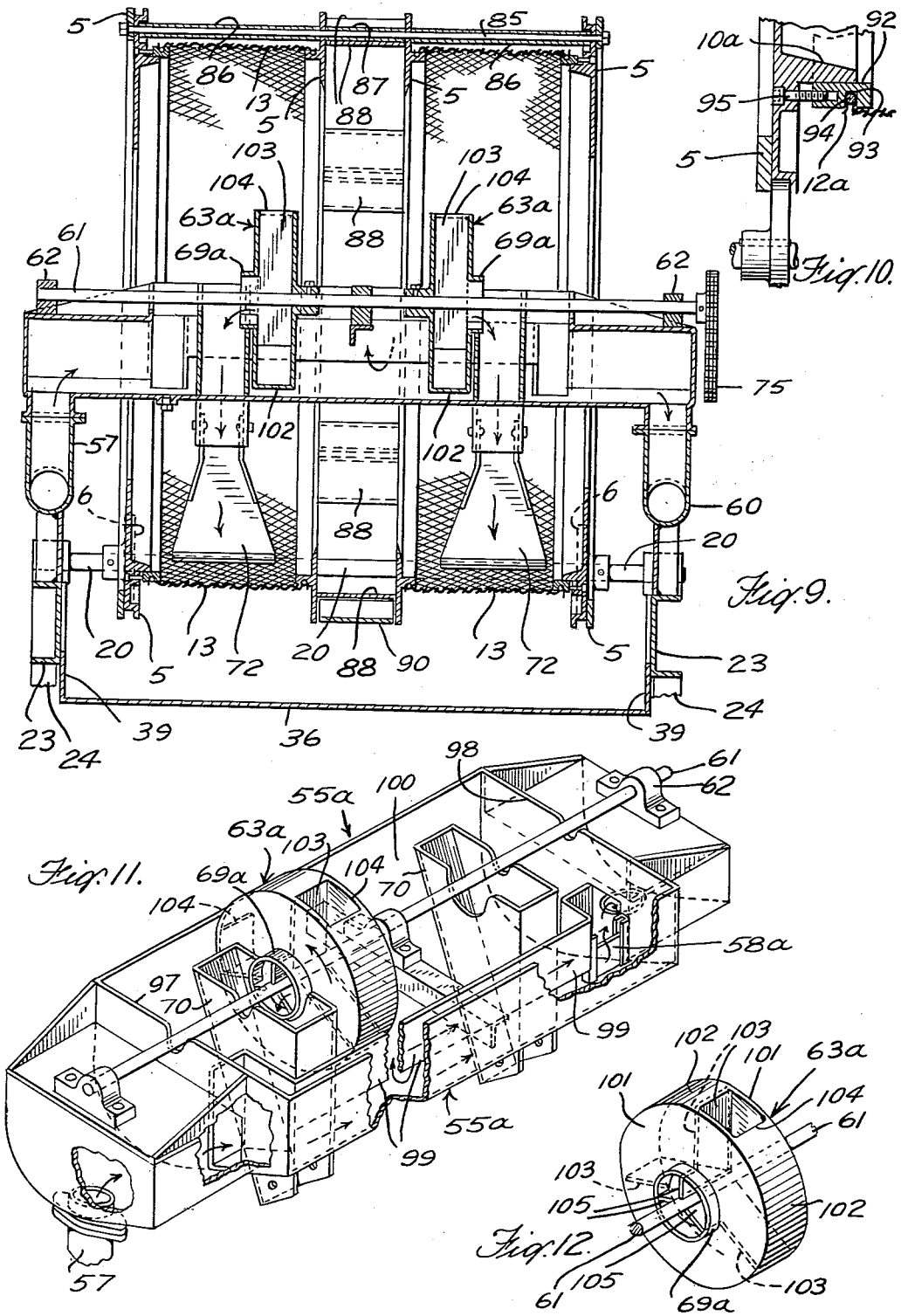

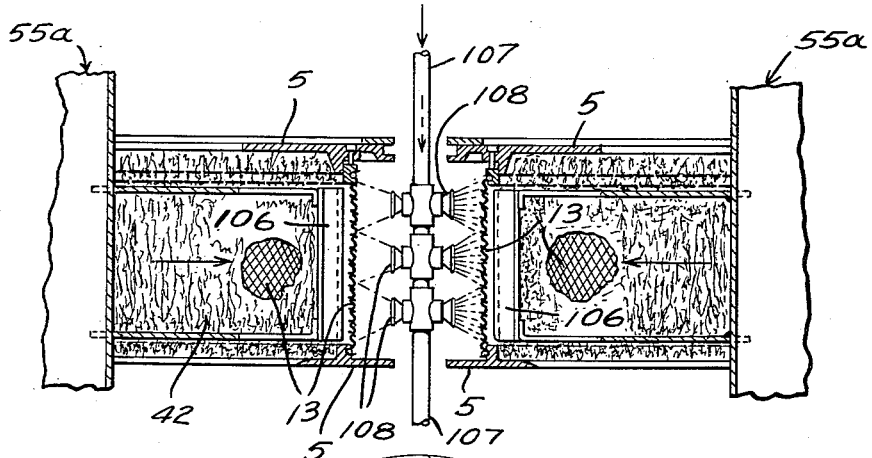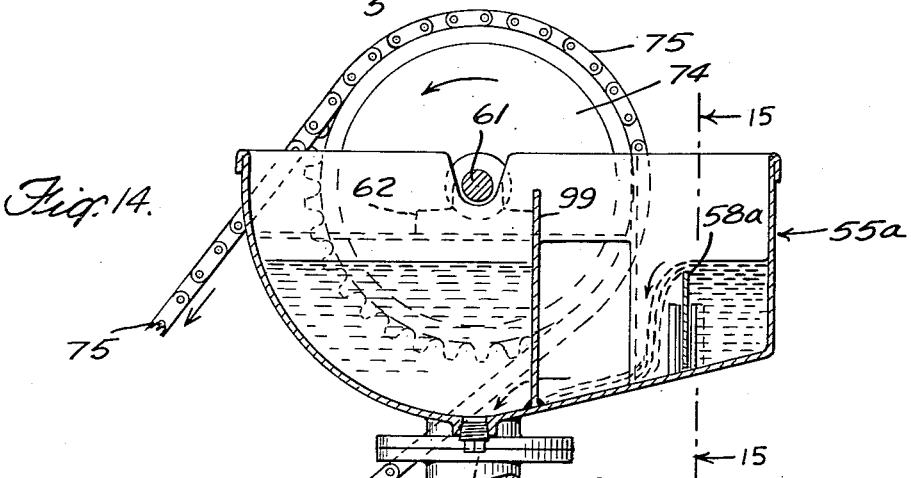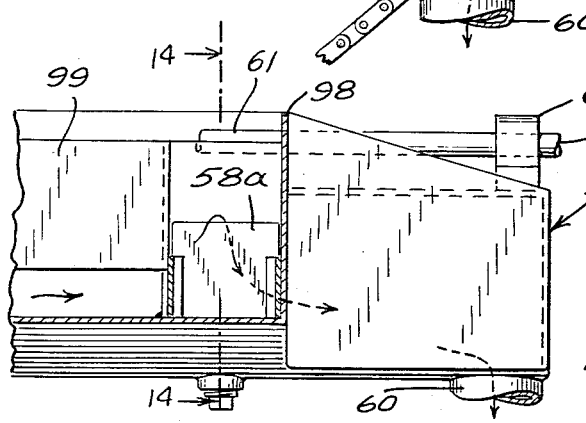

Jan. 14, 1964     E. G. SMITH     3,117,927
SLUDGE THICKENER
Filed Aug. 23, 1960     9 Sheets-Sheet 8

INVENTOR
EDMUND G. SMITH
BY
ATTORNEY

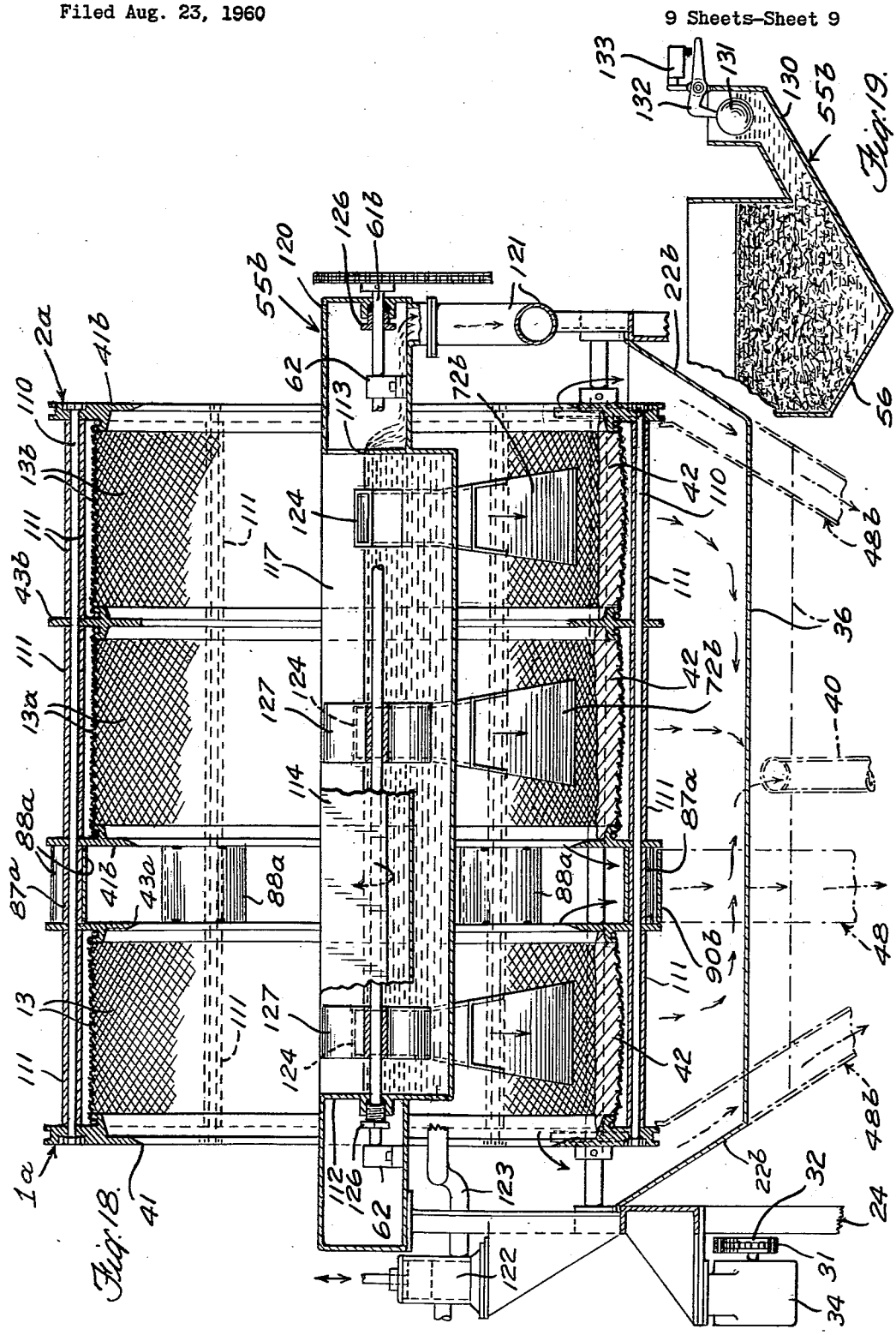

United States Patent Office 3,117,927
Patented Jan. 14, 1964

3,117,927
SLUDGE THICKENER
Edmund G. Smith, Cedar Grove, N.J., assignor to Equipment Development Company, Inc., Montclair, N.J., a corporation of New Jersey
Filed Aug. 23, 1960, Ser. No. 51,355
7 Claims. (Cl. 210—326)

This invention relates to apparatus for dewatering sludges of various types such as primary sewage sludge or other materials having similar characteristics.

More specifically the invention relates to improvements in apparatus of the rotary screen type which is disclosed in U.S. Patent No. 2,798,609, dated July 9, 1957, which embodies a rotating cylindrical screen onto which the sludge is fed and in which the separated solids form a rolling plug which picks up solids from the screen and builds up in size until it discharges axially over a flange at the end of the cylinder.

An object of the invention is to provide an apparatus of the above type having novel and improved characteristics.

Another object is to provide novel and improved feeding mechanism for feeding the sludge to a thickener of the above type.

Another object is to provide a novel and improved mechanical arrangement of a group of units of the above type.

Another object is to provide an arrangement of units wherein at least four such units discharge into a single hopper.

Another object is to provide apparatus of the above type having improved details of construction and features of operation.

More specific objects and advantages will be apparatus as the nature of the invention is more fully disclosed.

The invention will be better understood from the following description, taken in connection with the accompanying drawings in which specific embodiments are set forth for purposes of illustration.

In the drawings:

FIG. 1 is an end elevation of a thickener embodying the present invention;

FIG. 2 is a horizontal section taken on the line 2—2 of FIG. 1 but on a larger scale;

FIG. 3 is a transverse vertical section taken on the line 3—3 of FIG. 2;

FIG. 4 is a vertical longitudinal section taken on the line 4—4 of FIG. 1, but on the same scale as FIGS. 2 and 3;

FIG. 5 is a partial vertical section taken on the line 5—5 of FIG. 4 with parts broken away;

FIG. 6 is a partial vertical section taken on the line 6—6 of FIG. 3;

FIG. 7 is a vertical section similar to FIG. 3 illustrating a further embodiment of the invention;

FIG. 8 is a fragmentary vertical section taken on the line 8—8 of FIG. 7;

FIG. 9 is a vertical section taken on the line 9—9 of FIG. 7;

FIG. 10 is a detail view showing the means for mounting and adjusting the tension of the cylinder screen;

FIG. 11 is a detail perspective view showing the construction of the feed trough;

FIG. 12 is a detail view showing the construction of one of the feed trough buckets;

FIG. 13 is a horizontal section taken on the line 13—13 of FIG. 7;

FIG. 14 is a vertical section taken on the line 14—14 of FIG. 15;

FIG. 15 is a section taken on the line 15—15 of FIG. 14;

FIG. 18 is a transverse vertical section taken on the line 18—18 of FIG. 16; and FIG. 19 is a detail of the trough showing a further means for controlling the liquid level.

Figure 16:
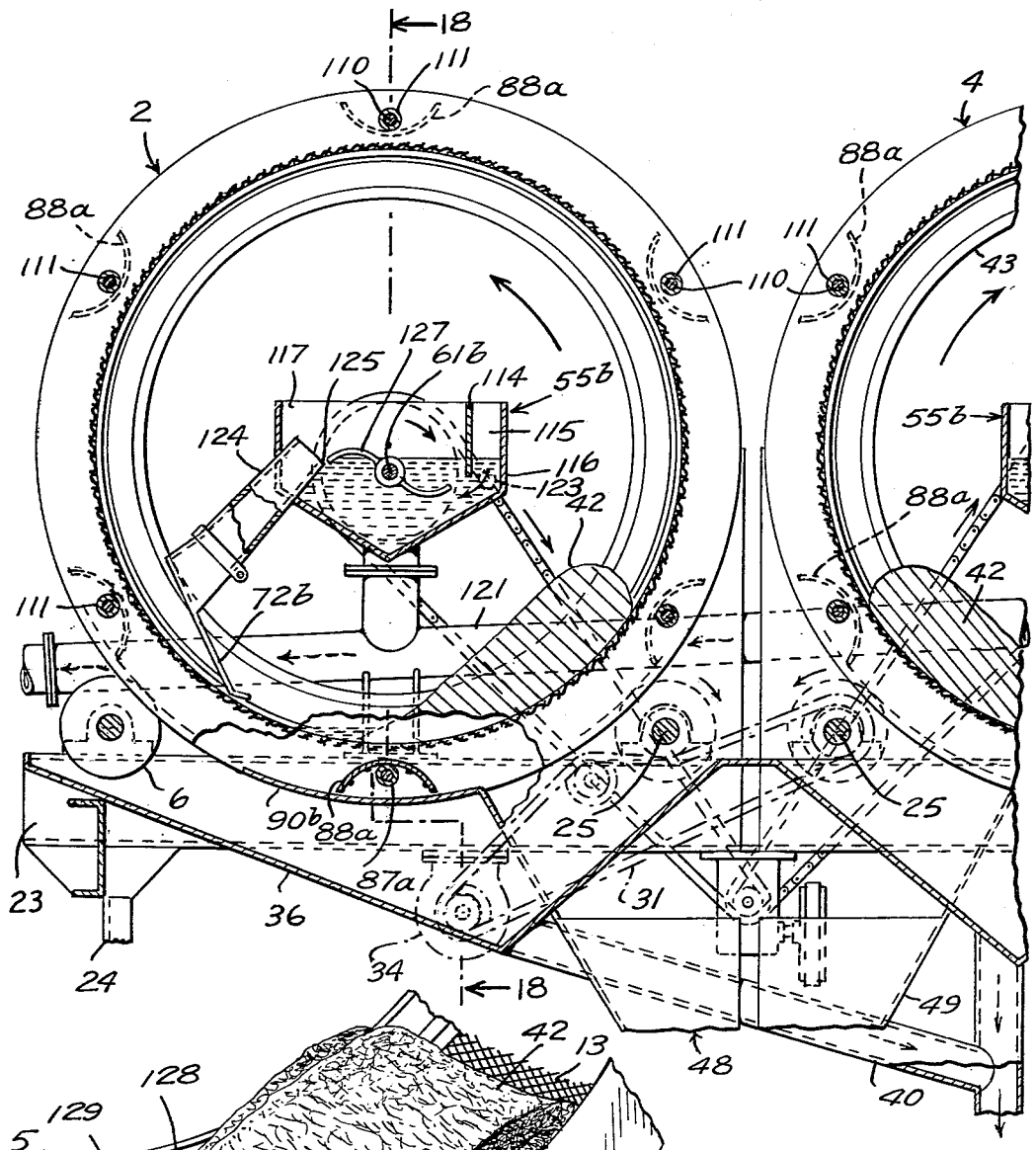
FIG. 16 is a vertical sectional view similar to FIG. 3 illustrating a further embodiment of the invention.

Referring first to FIGS. 1 through 6, the invention is shown as embodied in a thickener apparatus comprising four thickener cylinders 1, 2, 3 and 4, arranged in two pairs with the cylinders of each pair in axial alignment. Each cylinder is provided at its two ends with annular flanges 5 which rest upon and are supported by rollers 6 and 7.

The annular flanges 5 are formed with lips 10 having grooves 11 in which the edges 12 of a peripheral thickener screen 13 such as a wire mesh or woven fabric are secured by wires or packing 14.

The rollers 6 are mounted on shafts 20 which are journalled in bearing blocks 21 carried on inclined plates 22 which extend between and are secured to transverse beams 23 supported by vertical columns 24.

The rollers 7 are mounted on shafts 25 which are journalled in bearing blocks 26 carried by inclined plates 28 extending between and supported by the beams 23. The shafts 25 carry sprockets 30 which are driven by a chain 31 from a drive sprocket 32 on the shaft 33 of a motor 34. The chain 31 passes around an idler 35 which so positions the chain that the two shafts 25 are driven in opposite directions.

A drain pan 36 having a central sump 37 is attached at one side to the plate 22 and at the other side on a vertical wall 38 which is attached to the plate 28 so as to form a closure for drainage purposes beneath the various cylinders.

The ends of the sump 37 are closed by end walls 39. The sumps are drained by drain pipes 40.

The cylinders are provided at one end with annular flanges 41 of a height to prevent discharge of the plug 42 which is formed therein and at their other ends with an annular flange 43 of lesser height than the flanges 41 over which the material from the plugs 42 passes and is discharged. The flanges 41 and 43 are secured to the respective track flanges 5 of the various cylinders. The flanges 5 are secured together by tiebolts 44 and spacers 45 which are disposed around the periphery of the cylinder on the outside of the screen 13. The tiebolts 44 are provided with heads 46 which, at least on the end of the cylinder adjacent the annular flange 43 are countersunk within the flange 5 with the holes thus formed being filled in to provide a smooth outer surface for the flange 43 and the flange 5 to which it is attached.

For receiving the material discharged from the plugs 42 over the flanges 43 there is provided a hopper 48 having an inclined wall 49 and a substantially vertical wall 50 joined by transverse walls 51 which are disposed adjacent the respective flanges 43; the hopper thus formed being disposed in the space between the adjacent flanges 43 of the two cylinders of each pair and extending through a suitable opening in the drain pan 36. The inclined walls 49 of the two hoppers 48 extend below the drain pan 36 into a position to discharge the material from both hoppers 48 into a common discharge zone.

The walls 51 of the hoppers 48 have a running clearance with the smooth outer surface of the flanges 43 of the respective cylinders.

For supplying the primary sludge to the cylinders 1 to 4 for thickening, a pair of feed troughs 55 are provided each of which extends axially through a pair of aligned cylinders and is supported at the two ends by the transverse beams 23. Each feed trough 55 is provided with a pair of inclined lower walls 56 forming a V-shaped section. A feed pipe 57 is connected to the walls 56 at one end of each trough to supply sludge thereto. Near the other end of each trough a transverse dam 58 is provided over which the liquid flows into a chamber 59, the lower end of which is connected to a drain pipe 60.

A shaft 61 extends along the upper surface of each of the troughs 55 and is mounted in bearings 62 carried by the trough. A feed bucket 63 is disposed within each of the thickener cylinders. Each feed bucket 63 is formed by a pair of end walls 64 and 65 and a peripheral wall 66, forming a closed drum. A portion of the end wall 65 is inwardly inclined as shown at 67 and the peripheral wall 66 is correspondingly shaped. The shaft 61 extends eccentrically through the end wall 64 and through a hub member 67a which is carried by the inwardly inclined portion 67 of the end wall 65.

A portion of the peripheral wall 66 is provided with an opening 68 to receive the sludge material when the bucket dips into the liquid within the trough 55. A sleeve 69 extends outwardly from the wall 64 around the shaft 61 to discharge into a funnel 70 which is secured to the end of a feed pipe 71 extending through the V-shaped bottom 56 of the trough 55. The wall 64 is provided with an annular opening 64a communicating with the sleeve 69. The lower end of the pipe 71 discharges material on to a spreader plate 72 which is disposed within the respective cylinder adjacent the peripheral screen 13 and is adapted to feed the material onto the screen 13 at a point in advance of the center line of the cylinder in the direction of rotation.

The two shafts 61 are provided with sprockets 74 which are driven by chains 75 from sprockets 76 on a shaft 77 which is connected through a variable speed drive mechanism 78 to a drive motor 79.

A pipe 80 having a series of holes adapted to form sprays 81 is disposed within each of the cylinders 1 to 4 in a position to wash the inner surface of the screen 13. The pipes 80 are supported by the troughs 55 in a suitable manner.

In this embodiment the sludge, such as raw primary sewage sludge or the like is fed by the pipe 57 into the feeder trough 55 wherein it is maintained at a constant level by the overflow weir 58. The eccentric buckets 63 rotating on the shafts 61 dip into the sludge in the trough 55 at each revolution and feed the material thus scooped up through the axial sleeve 69 into the funnel 70, thence through the pipe 71 and spreader 72 onto the surface of the cylindrical screen 13. The rate of rotation of the shafts 61 is so adjusted by the variable speed drive 78 that material is fed to the various cylinder screens at the optimum rate for thickening. Since the buckets 63 are all rotated at the same rate the incoming material is fed in equal amounts to the various cylindrical units.

The units are driven by the rollers 7 on the drive shafts 25 which likewise are operated in unison and at the same speed. Hence a uniform treatment is maintained in the various units of the apparatus. The two pairs of cylindrical units are rotated in opposite directions so that the ascending sides of the screens are on the inside of the group. This causes the plugs 42 to be formed on the adjacent sides of the opposite units so that the plugs from the two pairs discharge into the same hopper.

In addition the two units of each pair are spaced axially with the two discharge flanges 43 on the adjacent ends so that the plugs in the two units discharge centrally into the same hopper. In this way all four units of the group discharge into the same hopper and the combined discharge is fed thereby onto the same compression filter or the like for second stage treatment.

Since the screen 13 is unsupported except at the edges it must be stretched tightly in order to avoid sagging at the center due to the weight of the plug 42 which is carried thereby. Metal screens which flex are usually undesirable as they tend to break due to repeated flexing. Stiff metal screening may be used in some instances, such as screens formed by wedge shaped wires. However, such materials usually are deficient in porosity and thus reduce the dewatering efficiency. Screens of synthetic plastic materials such as nylon are preferred. Such a screen may be composed of monofilament nylon on about 100 denier having a count of 100 in both directions.

In order to reduce the stretch of such a screen the nylon may first be boiled in water and then steamed and dried while in stretched condition. When so treated the screening can be applied under tension and when rewetted in operation will tend to shrink and remain tight. In this way the sag is reduced to a value such that the formation of the plug is not interfered with.

Materials such as sewage sludge usually have a sufficient amount of fiber present to agglomerate and form a plug 42 as set forth above. In many cases however it is desirable to expedite the agglomeration by the addition of a pulp having a polarity opposite that of the sludge particles. Paper pulp, asbestos, leather particles, potato pulp or the like may be used for this purpose. The quantity and size is selected in accordance with the nature of the sludge being thickened.

The embodiment of the invention shown in FIGS. 7 to 15 is generally similar to the embodiment above described and identical parts have been given the same reference numbers and will not be re-described.

In this form two axially aligned cylinders 1 and 2 are mounted as a single unit by tie rods 85 which extend through the flanges 5 of the aligned cylinders and are provided with spacers 86 to space the flanges of each cylinder and with spacers 87 to space the adjacent ends of the respective cylinders. The two aligned cylinders are thus rigidly secured to operate as a unit and since the track flanges 5 on the adjacent ends of the two cylinders are no longer required these flanges and the corresponding supporting rollers have been omitted and the two cylinders are supported by the track flanges 5 at the outer ends of the unit.

Curved shields 88 are carried by the inner flanges 5 of the respective cylinders and are disposed over the spacers 87 in order to prevent the plug material from becoming lodged on the spacers. In this embodiment the wall 49a of the hopper 48, which is generally similar to the wall 49 above described is provided with a curved extension 90 which passes around a portion of the lower periphery of the path of rotation of the curved shields 88 with a sufficiently small clearance to clean the curved extensions 90 as the shields 88 rotate.

In this embodiment means is also provided for tightening the fabric 13 on the various cylinders. For this purpose one of the lips 10a, as shown more in detail in FIG. 10, is shown as carrying a grooved ring 92 having a groove 93 in which the edge of the fabric 12a is secured as by a packing wire 94. The ring 92 is mounted to slide axially on the lip 10a and is adjustably secured to the flange 5 by means of bolts 95 so that the screen can be tightened by tightening the bolts 95.

In the embodiment of FIGS. 7 to 15 the feed trough 55a is formed with a transverse wall 97 at one end forming a closed inlet chamber and with a transverse wall 98 at the other end forming a closed outlet chamber. A longitudinal wall 99 extends between the walls 97 and 98 to form a distribution passage along the trough. The bottom of this wall 99 is spaced above the bottom of the trough 55a to provide a feed opening through which the material feeds into the main portion 100 of the trough. This construction provides for a uniform feeding of the material along the trough.

A dam 58a of adjustable height separates the feed passage from the discharge chamber and is adapted to control the height of the liquid in the longitudinal feed passage and consequently in the main portion 100 of the trough 55a.

The buckets 63a in this embodiment are mounted concentrically on the bucket shafts 61 and are formed by end walls 101 and peripheral walls 102 with radial partitions 103 disposed 120° apart around the peripheral wall and extending to the shaft 61 so as to divide the buckets into three compartments. The peripheral wall 102 is provided with openings 104 in each of the three compartments. In this case the sleeve 69a is provided with radial walls 105 registering with the radial walls 103 to divide the sleeve into three compartments communicating with the respective bucket compartments.

A curved deflecting plate 106 is shown as disposed in each of the thickener cylinders with an edge disposed in close proximity of the screen 13 and positioned to engage the leading edge of the plug 42 to assist in turning over the plug and to assist in starting the forming operation.

Air jets for assisting the formation of the plug and for cleaning the screen are provided by pipe 107 having nozzles 108 directed toward the outer periphery of the screen 13. Water may be supplied through pipe 107 and nozzles 108 onto the outer periphery of the screen 13 for cleaning the screen when desired.

In this embodiment the material to be dewatered is fed into the trough 55a as in the first form, the buckets 63a are mounted concentrically and are divided into three compartments which pick up the sludge and discharge it into the funnel 70 at each revolution of the shaft 61. This results in a more uniform feed to the screen and maintains a substantially constant supply of material for dewatering.

Since the two cylinders of each pair are secured rigidly together by the rods 85 only two supporting flanges are required for each pair. Should the frictional drive of the two flanged rollers 7 on the end flanges of the screen cylinders not be sufficient to effect drive without slippage a large driving gear (not shown) can be used for driving the units.

The curved shields 88 on the tie rods 85 prevent fibrous material from falling upon and wrapping around the tie rods. They also serve to wipe any material from the plate 90 into the hopper 48.

The embodiment shown in FIGS. 16 to 19 is generally similar to the embodiments above described and corresponding parts have been given the same reference numbers.

This embodiment differs from those previously described in that one of the thickening cylinders is formed as a double cylinder and both the single and the double cylinders are arranged to discharge the plugs at both ends.

In this form the thickener cylinder 1a is formed as a single unit which is similar to the cylinder 1 described previously except that the annular flange 41 of this form is of the same height as the flange 43a so that the plug 42 can be discharged over the flanges 41 and 43a at both ends of the unit.

The cylinder 2a is shown as a double cylinder having outer flanges 41b and a central flange 43b. Separate thickener screens 13a and 13b are secured in suitable grooves between the central flange 43b and the respective end flanges 41b, the screen being attached in the manner described above.

The flanges 41b and 43b are shown as of the same height and so disposed that the plug is discharged from both flanges 41b.

The cylinders 1a and 2a are secured together as a single unit by means of tie rods 110 which extend through the various flanges and are provided with spacers 111 which space the end flanges of the respective cylinders and spacers 87a which separate the cylinders as in the case of spacers 87 above described. These spacers 87a are provided with shields 88a for preventing the discharged material from lodging on the spacers.

A hopper 48 of the type above described is disposed between the cylinders 1a and 2a to receive the material discharged from the respective plugs. In this embodiment additional hoppers 48b are disposed at the outer ends of the cylinders 1a and 2a in a position to receive the material from the plugs discharged at those ends. The hoppers 48b are similar in construction to the hoppers 48 above described, but are inclined inwardly so that the material discharged from these hoppers as well as from the hopper 48 may be collected at a common point.

The end walls 22b of the drain pan may be inclined inwardly to conform to the angle of the hoppers 48b.

The feed trough 55b in this embodiment is centrally located with respect to the cylinders 1 to 4 and includes transverse partitions 112 and 113 adjacent the ends thereof between which a longitudinal division wall 114 extends forming a narrow feed channel 115 and a wide supply chamber 117. The bottom of the wall 114 is spaced from the bottom of the trough 55b to provide a communicating passage between channel 115 and the chamber 117 as in the previous form. The transverse wall 113 is of a height to provide for overflow into an overflow chamber 120 which is connected to a drain pipe 121. Material for thickening is fed into the trough 55b by a pump 122 through a discharge pipe 123 which communicates with the end wall 112 of trough 55b.

A feed pipe 124 extends upwardly through the trough 55b in the zone of each thickener cylinder and carries at its lower end a spreader 72b similar to the spreaders 72 above described. The open end of the feed pipe 124 is inclined with a lower edge 125 disposed at or slightly below the liquid level within the feed trough to form a weir over which the material in the chamber 117 flows into the pipe 124.

A shaft 61b extends through the end walls of the feed trough 55b through bushings 126 and carries paddles 127 which are disposed opposite the open ends of the feed pipes 124 and are positioned to wipe over the edges 125 of the feed pipes as the paddles rotate so as to prevent heavy or thick material from lodging on these surfaces. The paddles serve as agitators for the material in the feed trough 55b as well as to direct the material into the open ends of the pipes 124.

The shafts 61b are driven by means similar to the shaft 61 above described.

Figure 17:
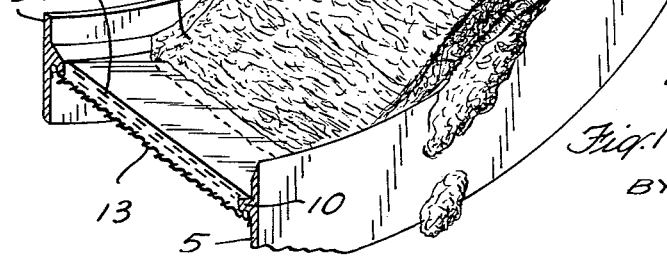
FIG. 17 is a fragmentary detail of the cylinder plug.

The liquid level in the embodiments shown in FIGS. 16–18 is controlled by adjusting the speed of the pump 122. This pump may be controlled by suitable means, one example of which is shown in FIG. 19 as a float chamber formed by a pipe 130 which enters the lower portion of the feed trough 55b and is formed with an upper vertical portion carrying a float 131 connected to a pivoted arm 132 which in turn is adapted to actuate a switch or the like 133 which may be connected to control the operation of the pump 122 in a manner to maintain the liquid level constant.

In FIG. 17 the plug 42 is shown as tier shaped in section with a lower thin portion 128 and with a liquid layer 129 in advance of the plug.

In this embodiment the feeder buckets are replaced by weirs 125 feeding directly into the pipes 124. Wipers 127 wipe the lips of the weirs and agitate the sludge in the chamber 117 so as to maintain a uniform supply. Since the weirs 125 feed directly into the pipes 124 a direct passage is provided which cannot be clogged by large particles. The liquid level may be maintained constant in the feeder trough by a float control, as shown in FIG. 19, or by a feeler in the trough to control the operation of the pump motor 122 or by any other suitable means. In all of these embodiments the location of the feed trough within the screen cylinders saves overall space, permits the units to be placed closer together, and also a direct path for supplying the sludge from the feed troughs onto the screens. The closer spacing of the units facilitates the discharge of the plugs from the various units into a single hopper.

It has been found that the capacity of the screen units is increased by permitting the plug to discharge from both ends of the cylinder as shown in FIGS. 16–18. By providing low flanges at both ends of the cylinder the plug discharges from both ends and a longer plug can be handled than in the first embodiments where the discharge is from one end only.

In order to prevent too much sag in the screen the screen may be divided into two halves as shown in FIG. 18 and a dividing flange 43b may be used at the center. This center flange may be omitted in some instances if the plug is of a consistency to separate at the center and feed to the outer ends of the cylinder by itself.

What is claimed is:

1. Apparatus for dewatering sludge or the like comprising a cylindrical screen mounted to rotate about a horizontal axis, said screen having an annular flange at at least one end over which a plug of dewatered material is discharged, a horizontal feeder trough extending axially within said cylindrical screen, feed means for feeding sludge for dewatering to said trough and having means to maintain said sludge at a predetermined level therein, a discharge pipe having an open upper end disposed substantially at the level of the sludge in said trough and extending downwardly through said trough and having an open lower end positioned to feed said sludge onto the inner surface of said screen and a rotary member within said trough positioned to dip into the sludge in said trough and feed the same into the open upper end of said pipe.

2. Apparatus as set forth in claim 1 in which said rotary member comprises a rotatable bucket positioned to scoop material from said trough at each rotation and having means discharging the scooped up material into said discharge pipe.

3. Apparatus as set forth in claim 2 in which said bucket comprises a closed drum mounted on a rotating shaft and having a peripheral opening dipping into the material in said trough and a hollow sleeve communicates with said drum and feeds into said discharge pipe.

4. Apparatus as set forth in claim 3 in which said drum is mounted eccentrically on said shaft.

5. Apparatus as set forth in claim 3 in which said drum is mounted concentric with said shaft and is divided into a plurality of compartments.

6. Apparatus for dewatering sludge or the like comprising at least four cylindrical screens arranged in two pairs, the screens of each pair being mounted to rotate about a common axis and having adjacent ends open and spaced apart axially to provide a discharge space therebetween, the two pairs being mounted to rotate about parallel axes with their open ends in radial alignment, means feeding material for dewatering onto the inner surface of said screens, means rotating the two pairs of screens in opposite directions with their adjacent sides ascending whereby the dewatered material accumulates on the adjacent sides of the respective screens, means causing said material to discharge axially through said open ends into said discharge spaces and a common hopper having an open end positioned in said discharge spaces below and coextensive with the open ends of said screens to receive the material discharged from all of said screens.

7. Apparatus for dewatering sludge or the like comprising at least four cylindrical screens arranged in two pairs, the screens of each pair being mounted to rotate about a common axis and having adjacent ends open and spaced apart axially to provide a discharge space therebetween, the two pairs being mounted to rotate about parallel axes with their open ends in radial alignment, means feeding material for dewatering onto the inner surface of said screens, means rotating the two pairs of screens in opposite directions with their adjacent sides ascending whereby the dewatered material accumulates on the adjacent sides of the respective screens, means causing said materal to discharge axially through said open ends into said discharge spaces, and a drain pan disposed beneath said screens to receive the liquid passing through said screens, and a hopper extending through said pan in said discharge space and having an open end positioned below and coextensive with the aligned open ends of the screens to receive the material discharged therefrom.

References Cited in the file of this patent

UNITED STATES PATENTS

| | | |
|---|---|---|
| 17,447 | Partz | June 2, 1857 |
| 1,717,604 | Haug et al. | June 18, 1929 |
| 1,722,603 | Turner | July 30, 1929 |
| 1,902,739 | Verstoep | Mar. 21, 1933 |
| 2,228,185 | Thompson | Jan. 7, 1941 |
| 2,602,549 | Peterson | July 8, 1952 |
| 2,798,609 | Smith et al. | July 9, 1957 |